United States Patent [19]

Himori

[11] Patent Number: 5,097,007
[45] Date of Patent: Mar. 17, 1992

[54] DITHIOCARBAMATE GROUP-CONTAINING POLYESTER

[75] Inventor: Shunichi Himori, Yokkaichi, Japan

[73] Assignee: Mistubishi Petrochemical Company Limited, Tokyo, Japan

[21] Appl. No.: 576,788

[22] Filed: Sep. 4, 1990

[30] Foreign Application Priority Data

Sep. 4, 1989 [JP] Japan .................................. 1-228724

[51] Int. Cl.$^5$ ...................... C08G 63/78; C08G 63/02; C08F 20/00
[52] U.S. Cl. .................................. 528/274; 525/437; 528/272
[58] Field of Search ................. 525/437; 528/272, 274

[56] References Cited

U.S. PATENT DOCUMENTS 4,435,546  3/1984  Bier et al. ............................. 525/418

Primary Examiner—John Kight, III
Assistant Examiner—T. Mosley
Attorney, Agent, or Firm—Oblon, Spivak, McClelland, Maier & Neustadt

[57] ABSTRACT

A polyester having dithiocarbamate group at its termini represented by the formula:

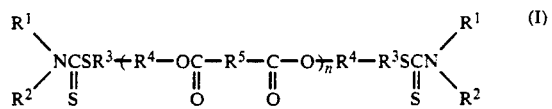

wherein, in preferred embodiments, $R^1$ and $R^2$ are ethyl, $R^3$ is

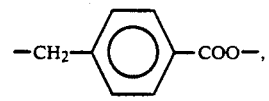

$R^4$ is $-CH_2CH_2-$, and $R^5$ is

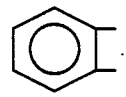

The dithiocarbamate groups in the polymer can easily be dissociated upon irradiation with UV to produce polymeric free radicals, which can initiate an ethylenically unsaturated monomer to form a block copolymer of a molecular structure of ABA where B indicates a block corresponding to the polyester and A indicates a block of the monomer polymerized.

6 Claims, No Drawings

DITHIOCARBAMATE GROUP-CONTAINING POLYESTER

BACKGROUND OF THE INVENTION (1) Field of the Invention

The present invention relates to a polyester having an excellent photopolymerization-initiating property to a radical-polymerizable monomer. More particularly, the present invention relates to a polyester having a dithiocarbamate group as the photofunctional group.

(2) Description of the Related Art

A high polymer generally called "polyester", which is obtained by polycondensation of a diol with a dicarboxylic acid, a dicarboxylic acid chloride or a dicarboxylic acid anhydride, is practically valuable because the physical properties can be adjusted within a wide range according to the kinds of monomers used, the molecular weight can be easily controlled and it has excellent transparency, surface hardness, heat resistance, electric resistance characteristics, chemical resistance, weatherability and durability. From the practical viewpoint, the polyester is roughly divided into a saturated polyester and an unsaturated polyester. The saturated polyester is represented by polyethylene terephthalate (PET) and is widely used as synthetic fibers, engineering plastics, elastomers and toners. The unsaturated polyester is represented by a resin synthesized from ethylene glycol and maleic acid and is a high polymer having a double bond in the main molecular chain, and the unsaturated polyester is widely used in the state dissolved in an ethylenically unsaturated monomer as a casting resin, a paint resin, a resin for a decorative board, a resin for a button or a resin for glass fiber-reinforced plastics (see Plastic Techniques, volume 13, written by Tsutomu Akita, published by Kogyo Chyosakai, 1970).

It is expected that the polyester will be applied to use in the fields where an optical reaction such as photocuring, photo-forming or photopolymerization is utilized, for example, a photoresist, a photo-curable ink or a photo-curable paint.

A polymeric initiator can be used as an intermediate material for a block copolymer and a graft copolymer. Accordingly, a polyester photopolymerization initiator can also be expected as an intermediate material for a polyester type block copolymer or graft copolymer.

As the conventional means for applying a polyester to the photopolymerization system, there is known a process in which a radical-polymerizable monomer and a photosensitizer are added to a polyester having a double bond mainly in the main molecular chain and the composition is irradiated with light to impart a crosslinked structure and obtain a molded article, a coating and the like (see "Photopolymer" compiled by Photopolymer Symposium and Editorial Committee, CMC, 1977, page 228 et seq).

According to the conventional technique, however, since the double bond cannot be specifically located at terminals of the main molecular chain, it is difficult to synthesize a block copolymer. Furthermore, if a crosslinked product of a polyester is synthesized, the radical-polymerizable monomer to be copolymerized is homopolymerized and a polymer not participating in the crosslinked structure is left separately from the polyester. It is considered that a mixture of a crosslinked polyester and a linear polymer is finally formed. It also is considered that the incorporated linear polymer has bad influences on the mechanical properties such as strength at break and impact strength and the chemical properties such as chemical resistance and water resistance in the formed crosslinked body.

SUMMARY OF THE INVENTION

It is a primary object of the present invention to provide a polyester capable of solving the above-mentioned problem, which can be valuably used as a polyester photopolymerization initiator.

In accordance with the present invention, there is provided a dithiocarbamate group-containing polyester represented by the formula (I):

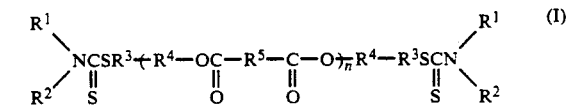

wherein:

$R^1$ and $R^2$ independently represent a hydrogen atom or an alkyl group having 1 to 10 carbon atoms, preferably 2 to 6 carbon atoms;

$R^3$ represents (a)

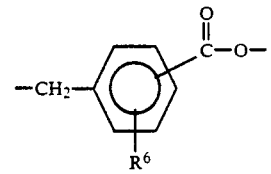

in which $R^6$ represents a hydrogen atom or an alkyl group having 1 to 4 carbon atoms, preferably to carbon atoms, (b)

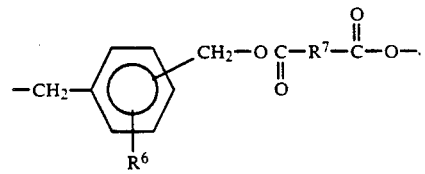

in which $R^6$ is as defined above and $R^7$ represents an alkylene group having 1 to 10 carbon atoms, preferably to carbon atoms, (c)

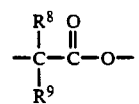

in which $R^8$ and $R^9$ independently represent a hydrogen atom or an alkyl group having 1 to 10 carbon atoms, preferably to carbon atoms, or (d)

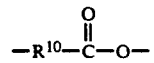

in which $R^{10}$ represents a linear or branched alkylene group having 1 to 10 carbon atoms, preferably to carbon atoms;

$R^4$ represents a polymer-constituting unit formed by esterifying a dihydric alcohol represented by HO—R$^4$—OH in which $R^4$ represents (a) a linear or branched alkylene group having 2 to 10 carbon atoms, preferably to carbon atoms, (b) a polyether polyalkylene group having 2 to 100 carbon atoms, preferably 4 to 50 carbon atoms and 1 to 98 oxygen atoms, preferably 3 to 48 oxygen atoms, (c)

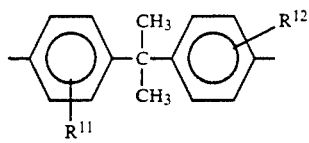

in which $R^{11}$ and $R^{12}$ independently represent a hydrogen atom or an alkyl group having 1 to 10 carbon atoms, preferably 1 to 5 carbon atoms, or (d)

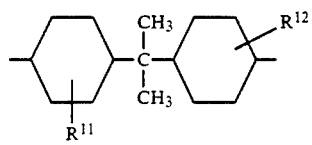

in which $R^{11}$ and $R^{12}$ are as defined above;

$R^5$ represents a polymer-constituting unit formed by esterifying a dibasic acid represented by

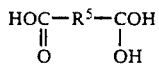

in which $R^5$ represents a saturated or unsaturated alkylene group having 2 to 10 carbon atoms, preferably 2 to 5 carbon atoms, or and

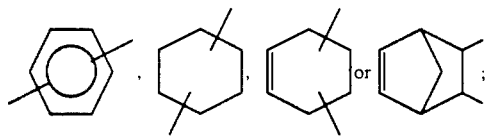

and n is a number of from 10 to 5000, preferably from 50 to 2000.

This dithiocarbamate group-containing polyester represented by formula (I) according to the present invention has characteristics described hereinafter, and therefore, this dithiocarbamate group-containing polyester has a very high polymerization-initiating activity to radical-polymerizable monomers and the above-mentioned problem encountered in applying the conventional polyesters to the photopolymerization system can be solved.

DETAILED DESCRIPTION OF THE INVENTION

[I] Dithiocarbamate Group-Containing Polyester

The dithiocarbamate group-containing polyester of the present invention is represented by the above-mentioned formula (I). This dithiocarbamate group-containing polyester has properties described below.

(1) Characteristics of the Polyester (a) Molecular Structure

The dithiocarbamate group-containing polyester is represented by the formula (I):

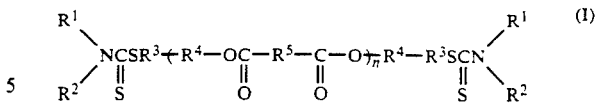

It is understood that this polyester has a structure formed by bonding a dithiocarbamate group through $R^3$ to a polyester having $R^4$—OH on both the terminals, which is represented by the formula (I'):

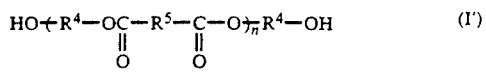

Alternatively, it is understood that this polyester has a structure formed by bonding a dithiocarbamate group to both the ends of a polyester formed by bonding —$R^3$— to both the ends of the above-mentioned polyester (I'), which is represented by the following formula (I''):

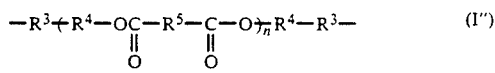

Since —$R^3$—, which is (a), (b) or (c) given said that the polyester (I'') is formed by esterifying —$R^4$—OH on both the terminals of polyester (I') with this monocarboxylic acid residue. Accordingly, —$R^3$— is bonded in such a manner that the carboxyl group side of —$R^3$— is bonded to the —OH side of —$R^4$—OH.

The other side, opposite to the carboxyl group side, of —$R^3$— is bonded to the dithiocarbamate group. This bonding is formed, for example, by a reaction of removing an alkali metal halide (for example, NaCl) between —$R^3$—X (X represents a halogen atom such as Cl) and an alkali metal (for example, Na) dithiocarbamate.

The dicarboxylic acid component constituting the polyester (I') is HOCO—$R^5$—COOH, and such polyester-forming dicarboxylic acids are known. If this dicarboxylic acid is an unsaturated dicarboxylic acid, the dicarboxylic acid is, for example, a maleic acid in which $R^5$ is —C=C—(the acid will be used in the form of an anhydride for formation of the polyester). If the dicarboxylic acid is an aromatic dicarboxylic acid, the dicarboxylic acid is, for example, o-phthalic acid or terephthalic acid in which $R^5$ is

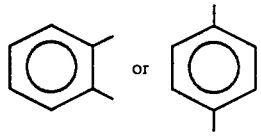

(o-phthalic acid will be used in the form of an anhydride and terephthalic acid will be used in the form of a lower alkyl ester for formation of the polyester).

Dihydric alcohols HO—$R^4$—OH constituting the polyester (I') are known. For example, the dihydric alcohol can be a bisphenol represented by formula (c), especially bisphenol A in which each of $R^{11}$ and $R^{12}$ is H, or a common alcohol. A typical instance of the latter alcohol is ethylene glycol in which $R^5$ is —$CH_2CH_2$—.

A typical instance of the group $R^3$ used as the linker for bonding the dithiocarbamate group to terminals of the polyester (I') is a group represented by formula (a).

As specific examples, there can be mentioned halomethylbenzoic acids, preferably chloromethylbenzoic acid, and 4-halomethylbenzoic acids, preferably 4-chloromethylbenzoic acid.

Both of groups $R^1$ in the dithiocarbamate groups represent a lower alkyl group, preferably an ethyl group.

(b) Properties as Photopolymerization Initiator

The dithiocarbamate group-containing polyester of formula (I) according to the present invention has a dithiocarbamate group on both the ends of the molecule, and therefore, the polyester has a photopolymerization-initiating activity (this dithiocarbamate group-containing polyester will sometimes be referred to as "polyester photopolymerization initiator" hereinafter). It is well-known that the dithiocarbamate group is dissociated into a radical by light to show an excellent polymerization-initiating activity and an excellent sensitizing activity [see "Kogyo Kagaku Zasshi", Volume 67, No. 12 (1964), page 2108 et seq.].

It also is known that this photopolymerization is a radical polymerization called "iniferter process" and has characteristics of living polymerization [see "Polymer Journal", Volume 16, No. 6 (1984), page 511 onward]. Accordingly, the polyester photopolymerization initiator is not deactivated, so far as it is irradiated with light, and the polyester polymerization initiator continues to possess the polymerization-initiating activity.

This polyester photopolymerization initiator exerts a photopolymerization-initiating activity to any of radical polymerizable monomers, that is, either so-called monofunctional monomers having one radical-polymerizable double bond in the molecule or so-called polyfunctional monomers having at least two radical-polymerizable double bonds in the molecule (radical-polymerizable monomer will sometimes be referred to simply as "monomer"hereinafter).

Of course, properties of the dithiocarbamate group-containing polyester, other than inherently possessed properties as the photopolymerization initiator, for example, pharmacological activities such as radiation resistance and herbicidal activity, complex-forming property and hydrophilic property can be utilized.

(c) Control of Structure and the Like of Formed Polymer

In the case where a monofunctional monomer is polymerized by using a polyester photopolymerization initiator having a dithiocarbamate group on both of the terminals and having no double bond in the main chain of the polyester, that is, a saturated polyester photopolymerization initiator, a block copolymer of ABA type can be obtained.

In the case where a monofunctional monomer is used as the monomer, the polymerization degree or molecular weight of the formed polymer can be controlled by selecting an appropriate molar ratio between the polyester photopolymerization initiator and the monomer. For example, if polymerization is carried out by using a polyester photopolymerization initiator having a molecular weight of 5,000 in a quantity of 100 g (0.02 mole) and methyl methacrylate having a molecular weight of 100 in a quantity of 100 g (1 mole), a polymer having a molecular weight of 10,000 is obtained. If polymerization is carried out by using 100 g of the same initiator and 300 g of the same methyl methacrylate, a polymer having a molecular weight of 20,000 is obtained.

In the case where a polyester photopolymerization initiator having a double bond in the polyester main chain, namely, an unsaturated polyester photopolymerization initiator, is used for polymerizing a monomer, or in the case where a monomer mixture containing a polyfunctional monomer is polymerized by using a saturated polyester photopolymerization initiator, a crosslinked polymer having a three-dimensional network structure, that is, a gel, is obtained.

Incidentally, it is well-known that the dithiocarbamate group exerts functions of a polymerization initiator, a chain transfer agent and a polymerization stopping agent at the photopolymerization, and mechanisms of these reactions have been elucidated.

When polymerization is carried out by using the polyester photopolymerization initiator of the present invention, the dithiocarbamate group-containing polyester is dissociated into a polyester radical and a dithiocarbamate radical under irradiation with light. The polyester radical participates in the initiating reaction and the dithiocarbamate radical participates in the stopping reaction. If irradiation with light is stopped or the monomer is completely consumed, the dithiocarbamate radical is added as the stopping agent to the terminals of the grown chain to form a dithiocarbamate group again. Accordingly, also the formed polymer can be used a polymeric photopolymerization initiator having a photopolymerization-initiating activity.

If a different monomer is further polymerized by using the formed polymeric photopolymerization initiator, a multi-block copolymer can be obtained, or if a macromonomer is used, a grafted block copolymer or grafted gel can be obtained. Thus, polymers differing in the molecule structure can be appropriately obtained. Accordingly, for example, a functional polymeric material or an elastomer can be provided.

(2) Synthesis of the Polyester

The dithiocarbamate group-containing polyester of the present invention, represented by the above-mentioned formula (I), can be synthesized in a high yield, for example, by substitution reaction between a polyester having both the terminals halogenated and a salt of dithiocarbamic acid. By this reaction, the halogen sites of the halogenated polyester can be quantitatively substituted with a dithiocarbamate group. From the viewpoint of the substitution speed, it is preferred that the halogen of the halogenated polyester be chlorine or bromine.

As the dithiocarbamic acid salt, alkali metal salts are preferably used and sodium dithiocarbamate is especially preferably used.

The polyester having both the terminals halogenated, to be used for the above reaction, can be synthesized by polycondensation. For example, the polyester can be synthesized according to the process disclosed in Takayuki Ohtsu and Masaetsu Kinoshita: "Experimental Processes for Synthesis of Polymers", Kagaku Dojin (1972), page 330 et seq. The polyester having both the terminals halogenated, to be used in the present invention, can be synthesized by carrying out polycondensation by using an appropriate amount of a halogen-containing monobasic acid or a halogen-containing monobasic acid derivative such as a halogen-containing monobasic acid chloride as the polymerization stopping agent for an ordinary combination of a dibasic acid, its salt or its acid anhydride and a dihydric alcohol.

More particularly, examples of dibasic acids, their esters and their acid anhydrides for use in the polycondensation include (i) linear saturated dibasic acids and their esters, such as succinic acid, adipic acid, azelaic acid and sebacic acid, and their esters; (ii) aromatic dibasic acids, such as phthalic acid, isophthalic acid, terephthalic acid and HET acid; (iii) unsaturated dibasic acids or their esters, such as maleic acid, fumaric acid, citraconic acid and dimer acids, and their esters; and (iv) acid anhydrides of dibasic acids including those given above, such as maleic anhydride, phthalic anhydride, tetrahydrophthalic acid anhydride, and hexahydrophthalic acid anhydride. Examples of dihydric alcohols for use in the polymerization with the dibasic acid compounds given above include ethylene glycol, propylene glycol, 1,3-butyleneglycol, 2,3-butylene glycol, 1,4-butylene glycol, butenediol, neopentyl glycol, diethylene glycol, dipropylene glycol, triethylene glycol, bisphenol A and hydrogenated bisphenol A. Examples of halogen-containing monobasic acids for use as the polymerization stopping agent include p-bromomethylbenzoic acid, mono(p-bromomethylbenzyl) ester of malonic acid, α-bromo-α-methylpropionic acid, and α-chloro-α-methylbutyric acid, (p-chloromethylbenzoic acid, and α-chloro-α-methylbutyric acid. Examples of halogen-containing monobasic acid chlorides includes p-bromomethylbenzoyl chloride, mono(p-bromomethylbenzyl) ester of malonyl monochloride, α-bromo-α-methylpropanyl chloride, α-bromo-α-methylbutyryl chloride, p-chloromethylbenzoyl chloride, mono(p-chloromethylbenzyl) ester of malonyl monochloride, α-chloro-α-methylpropanoyl chloride, and α-chloro-α-methylbutyryl chloride.

The polycondensation for preparing the polyesters having both the terminals halogenated may be conducted in the presence or absence of an organic solvent, under an inert atmosphere, at 150 to 300° C. for 2 to 20 hours with removal of the water or the alcohol at a predetermined temperature controlled thereat, to form the polyester in a solution or in bulk. Examples of the organic solvents which may be used for the polycondensation include benzene, toluene, xylene, ethylbenzene, acetone, methyl ethyl ketone, methyl isobutyl ketone, ethyl acetate, methyl cellosolve, ethyl cellosolve, dimethylformamide, isopropyl alcohol, butanol, hexane and heptane. Examples of the inert atmosphere include nitroqen and argon. When the polycondensation is conducted in a solvent which is used also in the subsequent dithiocarbamation, the product of the polycondensation in solution can be subjected to the dithiocarbamation. Even in the case where the polycondensation product in solution can be directly subjected to the dithiocarbamation, it is of course possible to subject the solution to precipitation by addition thereto of a precipitant which is a poor solvent to the polycondensate in the solution to form a precipitate, which is dissolved again in a solvent thereby to purify the polycondensate.

Then, dithiocarbamation of the polyeser obtained, namely the substitution reaction between the halogenated polyester and the dithiocarbamic acid salt is, in general, carried out at a temperature of 50 to 90° C in an inert gas atmosphere such as nitrogen by using an organic solvent such as toluene, xylene or ethyl acetate. A phase transfer catalyst such as trioctylmethylammonium chloride or tetrabutylammonium bromide can be used for this reaction. The substitution reaction produces alkalimetal halides such as sodium chloride or sodium bromide which have come from the dithiocarbamate used and the halogenated polyester used. These salts can easily be removed by washing the polycondensate formed with water. Removal of the salts is not always required since some use of the dithiocarbamated polyester may be tolerant of such salts. [II]Use as Photopolymerization Initiator (1) Radical-Polymerizable Monomer.

The radical-polymerizable monomer to be polymerized by using the dithiocarbamate group-containing polyester of formula (I) as the photopolymerization initiator is a monomer having a radical-polymerizable, ethylenic double bond. Namely, either a monofunctional monomer having one radical-polymerizable double bond or a polyfunctional monomer having at least two radical-polymerizable double bonds can be used.

As the monofunctional monomer, there can be mentioned, for example, aromatic monovinyl monomers such as styrene, p-chloromethylstyrene, o-aminostyrene and α-methylstyrene, (meth)acrylic monomers such as (meth)acrylic acid, methyl (meth)acrylate, ethyl (meth)acrylate, n-butyl (meth)acrylate, i-butyl (meth)acrylate, t-butyl (meth)acrylate, 2-ethylhexyl (meth)acrylate, n-octyl (meth)acrylate, 1-methylheptyl (meth)acrylate, n-nonyl (meth)acrylate, perfluoroethyl (meth)acrylate, hydroxyethyl (meth)acrylate, glycidyl (meth)acrylate; acrylonitrile, methacrylonitrile and (meth)acrylamide; vinyl halides such as vinyl chloride; vinylidene halides such as vinylidene choloride; and vinyl acetate, isobutylene, vinylidene cyanide, vinylpyrrolidone, vinylpyridine, N-vinylcarbazole, methylvinylketone, vinyl isocyanate, maleic anhydride and N-substituted maleimide. Furthermore, there can be mentioned a macromonomer having one radical-polymerizable vinyl group in the molecule and a main polymer chain composed of styrene, a (meth)acrylic acid ester or a polysiloxane.

Of the above-mentioned polyfunctional monomers, specific examples of bifunctional monomers having two radical-polymerizable double bonds in the molecule include 1,4-butanediol di(meth)acrylate, 1,6-hexanediol di(meth)acrylate, polyethyleneglycol di(meth)acrylate, diethyleneglycol di(meth)acrylate, neopentylglycol di(meth)acrylate, triethyleneglycol di(meth)acrylate, tripropyleneglycol di(meth)acrylate, neopentylglycol hydroxypivalate di(meth)acrylate, trimethylolpropane di(meth)acrylate, bis[(meth)acryloxyethoxy]bisphenol A, bis[(meth)acryloxyethoxy]tetrabromobisphenol A, bis[(meth)acryloxyethoxy]bisphenol A, 1,3-bis(hydroxyethyl)-5,5-dimethylhydantoin, 3-methylpentanediol di(meth)acrylate, di(meth)acrylates of neopentylglycol hydroxypivalate derivatives, and divinylbenzene.

Of the above-mentioned polyfunctional monomers, specific examples of polyfunctional monomers having at least three radical-polymerizable double bonds in the molecule include, for example, trimethylopropane tri(meth)acrylate, pentaerythritol tri(meth)acrylate, pentaerythritol tetra(meth)acrylate, dipentaerythritol monohydroxypenta(meth)acrylate, tris(2-hydroxyethyliso-cyanate) tri(meth)acrylate and tris(diethylene glycol)trimalate tri(meth)acrylate. Furthermore, there can be mentioned a macromonomer having at least two radical-polymerizable vinyl groups in the molecule and a main chain composed of styrene, a (meth)acrylic acid ester or a polysiloxane.

Incidentally, in the instant specification, "(meth)acrylic" and "(meth)acrylate" mean acrylic and methacrylic, and acrylate and methacrylate, respectively. Furthermore, "(meth)acryloxy" means acryloxy and methacryloxy.

(2) Polymerization

The polyester photopolymerization initiator used in the present invention can initiate polymerization of monomers as mentioned above, which are in contact with the polyester photopolymerization initiator, under irradiation with ultraviolet rays having a wavelength of 250 to 500 nm, preferably 300 to 400 nm, which have an energy necessary for dissociating the dithiocarbamate group from the polyester. Examples of sources of the UV rays include a mercury lamp, a halogen mercury lamp, a xenon lamp, ultraviolet laser or direct sum beam.

The polymerization process can be any of bulk polymerization, solution polymerization, suspension polymerization, slurry polymerization, emulsion polymerization and dispersion polymerization, so far as a necessary light energy can be given to the dithiocarbamate group of the polyester.

As the solvent for the solution polymerization process, use is preferably made of solvent having no characteristic absorption for ultraviolet rays having a wavelength of 250 to 500 nm, having a small chain transfer constant and being capable of sufficiently dissolving monomers and preferably polymers. Specific examples include benzene, toluene, xylene, ethylbenzene, acetone, methylethylketone, methylisobutylketone, ethyl acetate, methylcellosolve, ethylcellosolve, dimethylformamide, isopropyl alcohol, butanol, hexane, heptane and water.

Even when the polymerization atmosphere is an ordinary air atmosphere, no drastic reduction of the polymerization speed is caused, but an atmosphere of an inert gas such as nitrogen or argon is preferably used, If the polymerization temperature is lower than 10° C., the growth reaction speed of the radical polymerization is excessively low, and if the polymerization temperature is higher than 150° C., thermal polymerization is caused as a subsidiary reaction to a degree that cannot be neglected, in addition to the photopolymerization, 20 to 90° C. being preferable and 30 to 70° C. being more preferable.

Another photosensitizer can be further added to the polymerization system at the photopolymerization.

The polymer obtained by the photopolymerization can be deactivated to ultraviolet rays by treating the terminal dithiocarbamate groups after completion of the photopolymerization. The deactivation against ultraviolet rays can be accomplished, for example, by a treatment of the polymer with an acid or a basic solution, a treatment at a high temperature exceeding 250° C. for several minutes, and irradiation treatment with high-energy electromagnetic beams having a wavelength shorter than 220 nm, a photopolymerization treatment after addition of a monomer having an ultraviolet rayabsorbing group or a mere addition of an ultraviolet absorber. Furthermore, the terminal dithiocarbamate groups can be substituted by adding a reagent having a large chain transfer constant, for example, a thiol, under irradiation with ultraviolet rays. Moreover, the deactivation can be accomplished by an acid or alkali treatment.

The present invention will now be described in detail with reference to the following examples that by no means limit the scope of the invention. Incidentally, all of "%" in the examples are by weight unless otherwise indicated. (

(III) EXPERIMENTAL EXAMPLES

Production Example A

A reaction flask equipped with a stirrer was charged with 212.2 g of diethyleneglycol, 282.2 g of phthalic anhydride, 34.1 g of 4-chloromethylbenzoic acid and 500 g of xylene, and polymerization reaction was carried out at 150° C. in a nitrogen steam for about 3 hours and then at 220° C. for about 3 hours. The reaction product was cooled to give 518.0 g of a light yellow, transparent polyester. Then, 400 g of toluene and 9.0 g of sodium N,N-diethyldithiocarbamate were added to 200 g of the polyester obtained, and substitution reaction was carried out at 50° C. in a nitrogen atmosphere for about 5 hours. the obtained polyester solution was washed with 2 liters of pure water three times and was then dehydrated by a rotary evaporator. Then, the solution was subjected to a precipitation purification treatment with hexane and the precipitated solid was dried under reduced pressure to give 195 g of a polyester having a number average molecular weight of 9,800 and a weight average molecular weight of 32,000. When the obtained polyester was analyzed by an ultraviolet absorbance meter, it was found that the dithiocarbamate group was added to the polyester in an amount of 1.98 moles per mole of the polyester obtained. This polyester will be called "polyester A"hereinafter.

Production Example B

Polymerization was carried out under the same conditions as adopted in Production Example A except that 33.4 g of α-bromoisobutyric acid was used instead of 34.1 g of 4-chloromethylbenzoic acid used in Production Example A. As the result, 517.2 g of a light yellow, transparent polymer was obtained.

Then, 200 g of the polyester obtained was subjected to the substitution reaction in the same manner as described in Production Example A and the post treatments were conducted under the same conditions as adopted in Production Example A, whereby 196 g of a polyester having a number average molecular weight of 9,900 and a weight average molecular weight of 33,000 was obtained. When the obtained polyester was analyzed by an ultraviolet absorbance mater, it was found that the dithiocarbamate group was added to the polyester in an amount of 1.97 moles per mole of the polyester obtained. The obtained polyester will be called "polyester B" hereinafter.

Production Example C

Polymerization reaction was carried out under the same conditions as described in Production Example A except that 141.1 g of phthalic anhydride and 98.1 g of maleic anhydride were used instead of 282.2 g of phthalic anhydride used in Production Example A, whereby 442.3 g of a light yellow, transparent polyester was obtained.

Then, 200 g of the polyester obtained was subjected to the substitution reaction under the same conditions as adopted in Production Example A, and the post treatments were conducted under the same conditions as adopted in Production Example A, whereby a polyester having a number average molecular weight of 9,700 and a weight average molecular weight of 32,000 was obtained. When the polyester obtained was analyzed by an ultraviolet absorbance meter, it was found that the dithiocarbamate group was added to the polyester in an amount of 1.98 moles per mole of the obtained polyester. The obtained polyester will be called "polyester C" hereinafter.

USE EXAMPLE 1

A Pyrex glass vessel was charged with 50 g of polyester A synthesized in Production Example A, 50 g of methyl methacrylate and 200 g of toluene, and the residual gas in the vessel was sufficiently replaced by nitrogen and the vessel was plugged. Then, the charge of the vessel was irradiated with ultraviolet rays for 10 hours at a position distant by 15 cm from a 400-W ultraviolet ray lamp (high-pressure mercury lamp H400PL supplied by Toshiba Lightec) while maintaining the temperature in the vessel at 60° C. whereby a light yellow, viscous polymer solution was obtained. The obtained polymer solution was subjected to the precipitation purification with 3 liters of hexane and the precipitate solid was dried at 60° C. for 10 hours by a reduced pressure drier to give 95 f of a polymer.

The average molecular weight of the polymer obtained was measured by the gel permeation chromatography and the morphology was observed by a scanning electron microscope. The results obtained are shown in Table 1. From Table 1, it is seen that the polymer obtained is a block copolymer of ABA type having a microdomain structure.

USE EXAMPLE 2

A Pyrex glass vessel was charged with 50 g of polyester A synthesized in Production Example A, and 50 g of styrene and 200 g of toluene, and the residual gas in the vessel was sufficiently replaced by nitrogen and the vessel was plugged. The charge in the vessel was irradiated for 10 hours with ultraviolet rays at a position distant by 15cm from a 400-W ultraviolet lamp (high-pressure mercury lamp H400PL supplied by Toshiba Lightec) while maintaining the temperature in the vessel at 60° C., whereby a light yellow, viscous polymer solution was obtained. The polymer solution was subjected to the precipitation purification treatment with 3 liters of hexane, and the precipitated solid was dried at 60° C. for 10 hours by a reduced pressure drier to give 93 g of a polymer.

The average molecular weight of the polymer obtained was measured by the gel permeation chromatography and the morphology of the polymer was observed by a scanning electron microscope. The results obtained are shown in Table 1. From Table 1, it is seen that the polymer obtained is a block polymer of ABA type having a microdomain structure.

USE EXAMPLE 3

A Pyrex glass vessel was charged with 50 g of polyester A synthesized in Production Example A, 50 g of butyl acrylate and 200 g of toluene, and the residual gas in the vessel was sufficiently replaced by nitrogen and the vessel was plugged. Then, the charge of the vessel was irradiated with ultraviolet rays for 10 hours at a position distant by 15 cm from a 400-W ultraviolet ray lamp (high-pressure mercury lamp H400PL supplied by Toshiba Lightec) while maintaining the temperature in the vessel at 60° C., whereby a light yellow, viscous polymer solution was obtained. The obtained polymer solution was subjected to the precipitation purification with 3 liters of hexane and the precipitated solid was dried at 60° C. for 10 hours by a reduced pressure drier to obtained 94 g of a polymer.

The average molecular weight of the polymer obtained was measured by the gel permeation chromatography and the morphology was observed by a scanning electron microscope. The results obtained are shown in Table 1. From Table 1, it is seen that the polymer obtained is a block copolymer of ABA type having a microdomain structure.

USE EXAMPLE 4

A Pyrex glass vessel was charged with 50 g of polyester B synthesized in Production Example B, 50 g of methyl methacrylate and 200 g of toluene, and the residual gas in the vessel was sufficiently replaced by nitrogen and the vessel was plugged. Then, the charge of the vessel was irradiated with ultraviolet rays for 10 hours at a position distant by 15 cm from a 400-W ultraviolet ray lamp (high-pressure mercury lamp H400PL supplied by Toshiba Lightec) while maintaining the temperature in the vessel at 60° C., whereby a light yellow, viscous polymer solution was obtained. The obtained polymer solution was subjected to the precipitation purification with 3 liters of hexane and the precipitated solid was dried at 60° C. for 10 hours by a reduced pressure drier to obtain 95 g of a polymer.

The average molecular weight of the polymer obtained was measured by the gel permeation chromatography and the morphology was observed by a scanning electron microscope, the results obtained are shown in Table 1. From Table 1, it is seen that the polymer obtained is a block copolymer of ABA type having a microdomain structure.

USING EXAMPLE 5

A Pyrex glass vessel was charged with 50 g of polyester B synthesized in Production Example B, 50 g of styrene and 200 g of toluene, and the residual gas in the vessel was sufficiently replaced by nitrogen and the vessel was plugged. Then, the charge of the vessel was irradiated with ultraviolet rays for 10 hours at a position distant by 15 cm from a 400-W ultraviolet ray lamp (high-pressure mercury lamp H400PL supplied by Toshiba Lightec) while maintaining the temperature in the vessel at 60° C., whereby a light yellow, viscous polymer solution was obtained. The obtained polymer solution was subjected to the precipitation purification with 3 liters of hexane and the precipitated solid was dried at 60° C. for 10 hours by a reduced pressure drier to obtain 93 g of a polymer.

The average molecular weight of the polymer obtained was measured by the gel permeation chromatography and the morphology was observed by a scanning electron microscope. The results obtained are show in Table 1. From Table 1, it is seen that the polymer obtained is a block copolymer of ABA type having a microdomain structure.

USING EXAMPLE 6

A Pyrex glass vessel was charged with 50 g of polyester B synthesized in Production Example B, 50 g of butyl acrylate and 200 g of toluene, and the residual gas in the vessel was sufficiently replace by nitrogen and the vessel was plugged. Then, the charge of the vessel was irradiated with ultraviolet rays for 10 hours at a position distant by 15 cm from a 400-W ultraviolet ray lamp (high-pressure mercury lamp H400PL supplied by Toshiba Lightec) while maintaining the temperature in the vessel at 60° C., whereby a light yellow, viscous polymer solution was obtained. The obtained polymer solution was subjected to the precipitation purification with 3 liters of hexane and the precipitated solid was dried at 60° C. for 10 hours by a reduced pressure drier to obtain 94 g of a polymer.

The average molecular weight of the polymer obtained was measured by the gel permeation chromatography and the form was observed by a scanning electron microscope. The results obtained are shown in Table 1. From Table 1, it is seen that the polymer obtained is a block copolymer of ABA type having a microdomain structure.

USING EXAMPLE 7

A Pyrex glass vessel was charged with 50 g of polyester C synthesized in Production Example C and 50 g of styrene, and the residual gas in the vessel was sufficiently replaced by nitrogen and the vessel was plugged. Then, the charge of the vessel was irradiated with ultraviolet rays for 10 hours at a position distant by 15 cm from a 400-W ultraviolet ray lamp (high-pressure mercury lamp H400PL supplied by Toshiba Lightec) while maintaining the temperature in the vessel at 60° C. When the product was recovered from the glass vessel, 99 g of a hard rigid polymer was obtained.

The polymer obtained was insoluble in toluene, acetone, ethyl acetate, methanol, tetrahydrofuran, gasoline, kerosene and water, and when the polymer was immersed in these liquids for 24 hours at normal temperature, the appearance was not change at all.

USING EXAMPLE 8

When 20 g of polyester C synthesized in Production Example C was applied in a thickness of 50 μ on a glass plate by using a bar coater, the coating operation could be performed easily and uniformly and the coating obtained had a smooth surface. The coating was irradiated with ultraviolet rays for 1 minute by using an ultraviolet ray irradiation apparatus (Toscure 400 supplied by Toshiba Lightec) located above the coating at a point distant by 2 cm from the coating, whereby the coating was crosslinked and a tough cured coating was obtained. The contact angle of the obtained coating to water was 87° C.

TABLE 1

| Use Example No. | Number average molecular weight | Weight average molecular weight | Morphology observed |
|---|---|---|---|
| 1 | $5.8 \times 10^4$ | $20.3 \times 10^4$ | microdomain structure |
| 2 | $5.9 \times 10^4$ | $20.7 \times 10^4$ | " |
| 3 | $6.2 \times 10^4$ | $21.8 \times 10^4$ | " |
| 4 | $5.9 \times 10^4$ | $21.0 \times 10^4$ | " |
| 5 | $6.1 \times 10^4$ | $21.4 \times 10^4$ | " |
| 6 | $6.5 \times 10^4$ | $23.1 \times 10^4$ | " |

What is claimed is:

1. A dithiocarbamate group-containing polyester represented by the formula (I):

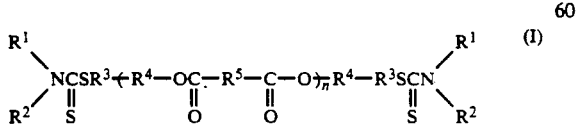

wherein:

$R^1$ and $R^2$ independently represent a hydrogen atom or an alkyl group having 1 to 10 carbon atoms, $R^3$ represents (a)

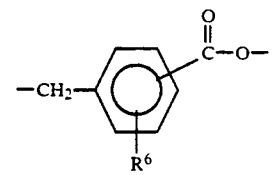

in which $R^6$ represents a hydrogen atom or an alkyl group having 1 to 4 carbon atoms, (b)

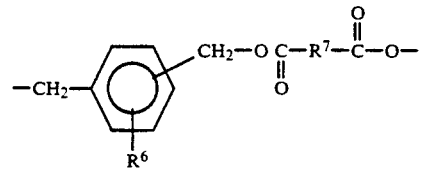

in which $R^6$ is as defined above and $R^7$ represents an alkylene group having 1 to 10 carbon atoms, (c)

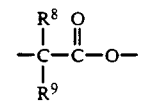

in which $R^8$ and $R^9$ independently represent a hydrogen atom or an alkyl group having 1 to carbon atoms, or (d)

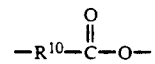

in which $R^{10}$ represents a linear or branched alkylene group having 1 to 10 carbon atoms;

$R^4$ represents a polymer-constituting unit formed by esterifying a dihydric alcohol represented by HO—$R^4{}^{13}$ OH in which $R^4$ represents (a) a linear or branched alkylene group having 2 to 10 carbon atoms, (b) a polyether polyalkylene group having 2 to 100 carbon atoms, and 1 to 98 oxygen atoms, (c)

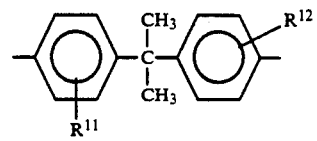

in which $R^{11}$ and $R^{12}$ independently represent a hydrogen atom or an alkyl group having 1 to 10 carbon atoms, or (d)

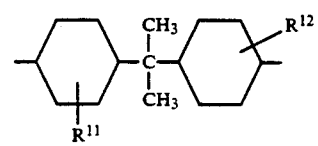

in which $R^{11}$ and $R^{12}$ are as defined above;

$R^5$ represents a polymer-constituting unit formed by esterifying a dibasic acid represented by

HOC—$R^5$—COH
‖   |
O   OH in which $R^5$ represents a saturated or unsaturated alkylene group having 2 to 10 carbon atoms,

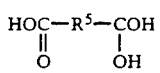

and n is a number of from 10 to 5000.

2. A polyester as set forth in claim 1, wherein $R^5$ is

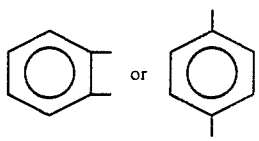

3. A polyester as set forth in claim 1, wherein $R^4$ is a residue from disphenol A or a residue from ethyleneglycol.

4. A polyester as set forth in claim 1, wherein $R^3$ is

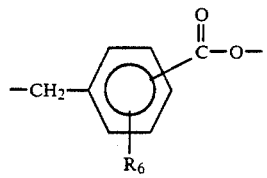

in which $R^6$ is as set forth above.

5. A polyester as set forth in claim 1, wherein $R^3$ is

—CH$_2$—⌬—C(=O)—O—.

6. A polyester as set forth in claim 1, wherein each of $R^1$ and $R^2$ is an ethyl group.

* * * * *